(12) United States Patent
Sasano et al.

(10) Patent No.: US 7,150,335 B2
(45) Date of Patent: Dec. 19, 2006

(54) FRONT END STRUCTURE OF VEHICLE

(75) Inventors: Norihisa Sasano, Ama-gun (JP); Yuhei Kunikata, Kariya (JP)

(73) Assignee: Denso Corporation, Kariya (JP)

( * ) Notice: Subject to any disclaimer, the term of this patent is extended or adjusted under 35 U.S.C. 154(b) by 152 days.

(21) Appl. No.: 10/831,499

(22) Filed: Apr. 23, 2004

(65) Prior Publication Data

US 2004/0211607 A1 Oct. 28, 2004

(30) Foreign Application Priority Data

Apr. 24, 2003 (JP) ............................. 2003-120434

(51) Int. Cl.
B60K 11/04 (2006.01)
(52) U.S. Cl. .................. 180/68.4; 180/68.6; 180/68.1; 123/41.49; 123/41.51; 165/41; 165/51; 165/67
(58) Field of Classification Search ............... 180/68.4, 180/68.6, 68.1, 68.2, 68.3; 123/41.48, 41.49, 123/41.51; 165/41, 51, 53, 54, 55, 67
See application file for complete search history.

(56) References Cited

U.S. PATENT DOCUMENTS

| 5,219,016 | A | * | 6/1993 | Bolton et al. ................. 165/41 |
| 5,271,473 | A | * | 12/1993 | Ikeda et al. ................. 180/68.4 |
| 5,701,854 | A | * | 12/1997 | Hauser ..................... 123/41.49 |
| 6,155,335 | A | * | 12/2000 | Acre et al. ..................... 165/41 |
| 6,470,961 | B1 | * | 10/2002 | Case ........................... 165/78 |
| 6,508,506 | B1 | * | 1/2003 | Ozawa et al. .......... 296/203.02 |
| 6,626,483 | B1 | * | 9/2003 | Ozawa et al. .............. 180/68.1 |
| 2001/0050160 | A1 | * | 12/2001 | Ozawa et al. ................. 165/67 |
| 2002/0162695 | A1 | * | 11/2002 | Ozawa et al. .............. 180/68.2 |

FOREIGN PATENT DOCUMENTS

| JP | 61-20431 | | 2/1986 |
| JP | 2003-127903 | | 5/2003 |
| JP | 2003127903 | * | 5/2003 |

* cited by examiner

Primary Examiner—Christopher P. Ellis
Assistant Examiner—John Walters
(74) Attorney, Agent, or Firm—Harness, Dickey & Pierce, PLC

(57) ABSTRACT

In a front end structure of a vehicle, a front end panel and a fan shroud are provided as separate parts. The front end panel and the fan shroud form labyrinthine gap structure between them. The labyrinthine gap structure restricts air from leaking or entering through a space between the front end panel and the fan shroud. Accordingly, a heat exchanging performance of a heat exchanger is not decreased. Also, the front end panel and the fan shroud are separately exchangeable or repairable.

7 Claims, 4 Drawing Sheets

FRONT END STRUCTURE OF VEHICLE

CROSS REFERENCE TO RELATED APPLICATION

This application is based on Japanese Patent Application No. 2003-120434 filed on Apr. 24, 2003, the disclosure of which is incorporated herein by reference.

BACKGROUND OF THE INVENTION

1. Field of the Invention

The present invention relates to a front end structure of a vehicle.

2. Related Art

At the front end of a vehicle, a radiator and a condenser are elastically supported by a front end panel. A vehicle front end structure of Unexamined Japanese Patent Publication No. JP-A-2003-127903, it is proposed to form a labyrinthine gap structure between the radiator and the front end panel. Also, the front end panel is integrally formed with a shroud surrounding a fan. The labyrinthine gap structure is provided by an opposing panel portion formed on the front end panel at a position opposing an outer peripheral portion of the radiator and an opposing radiator portion formed on the radiator at a position opposing the opposing panel portion. By this labyrinthine gap structure, a gap between the fan and the radiator is effectively sealed without causing the radiator to contact the front end panel.

In this front end structure, however, the shroud is integrated into the front end panel. Therefore, it is difficult to exchange the front end panel and the shroud separately or solely, for example, when the vehicle collides and the parts are broken. As a result, it is likely to reduce serviceability.

SUMMARY OF THE INVENTION

The present invention is made in view of the foregoing matters, and it is an object of the present invention to provide a vehicle front end structure capable of increasing serviceability. It is another object of the present invention to provide a vehicle front end structure capable of restricting a decrease in a heat-exchanging performance of a heat exchanger due to air leakage through a gap between a front end panel and a fan shroud.

According to a front end structure of the present invention, a front end panel is fixed to a vehicle body at a front end of the vehicle and extends in a vehicle right and left direction. A heat exchanger is fixed to the front end panel. A fan is disposed adjacent to the heat exchanger for creating a flow of air passing through the heat exchanger. Also, a fan shroud is provided on a periphery of the blower to surround a gap between the heat exchanger and the fanso that the flow of air created by the blower is restricted from bypassing the heat exchanger. The front end panel forms an opposing panel portion opposing an outer periphery of the fan shroud. Further, the fan shroud forms an opposing shroud portion opposing the opposing panel portion of the front end panel. The opposing panel portion and the opposing shroud portion define a labyrinthine gap structure between them.

Accordingly, even if the front end panel and the fan shroud are provided as separate parts, air leakage through the gap between the front end panel and the fans shroud is restricted by the labyrinthine gap structure. Therefore, a decrease in a heat-exchanging performance of the heat exchanger is restricted. Also, the front end panel and the fan shroud are separately or independently exchanged or repaired when the part is broken such as due to a vehicle collision. Accordingly, serviceability is improved.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
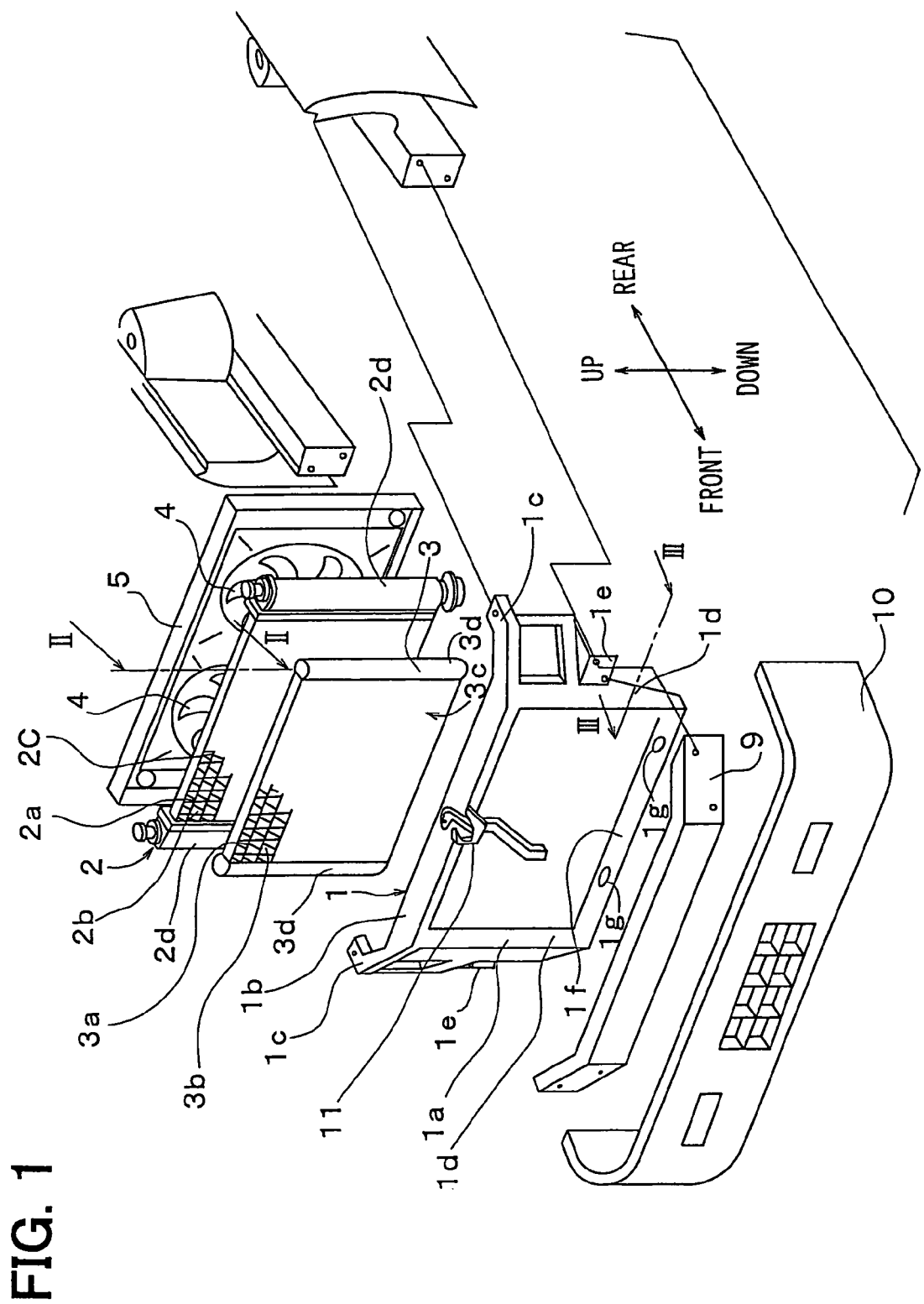
FIG. 1 is an exploded perspective view of a front end structure of a vehicle according to a first embodiment of the present invention.

Embodiments of the present invention will be described hereinafter with reference to the drawing.

First Embodiment

Referring to FIG. 1, a front end panel 1 is fixed to a vehicle body at a vehicle front end. The front end panel 1 generally extends in a vehicle right and left direction (vehicle width direction). The front end panel 1 includes a frame portion 1a, first fixing portions 1c and second fixing portions 1e. The frame portion 1a has a substantially rectangular shape. The first fixing portions 1c extend from longitudinal ends of an upper beam portion 1b of the frame portion 1a toward a side body of the vehicle. The second fixing portions 1e are formed on side pillar portions 1d of the frame portion 1a.

Further, radiator fixing portions 1g for fixing a radiator 2 are formed on the upper beam portion 1b and a lower beam portion 1f of the frame portion 1a. The radiator 2 is elastically supported by the front end panel 1 through an elastic supporting member (not shown) such as a rubber vibration insulator, which is elastically deformable. In the embodiment, the frame portion 1a, the first fixing portions 1c and the second fixing portions 1e are integrally formed into a single article from a reinforced resin material. For example, the reinforced resin material includes carbon fiber, glass fiber, or the like.

The front end panel 1 is also referred to as a carrier or a radiator support. In general, the radiator 2 and headlamp are mounted to the vehicle body through the front end panel 1.

A condenser 3 of a vehicle air conditioning-unit is fixed to the radiator 2 at an upstream position of the radiator 2 with respect to a flow direction (arrow A in FIG. 2) of cooling air. Thus, the condenser 3 is mounted to the front end panel 1 through the radiator 2. The radiator 2 and the condenser 3 vibrate or move with the front end panel 1.

Figure 2:
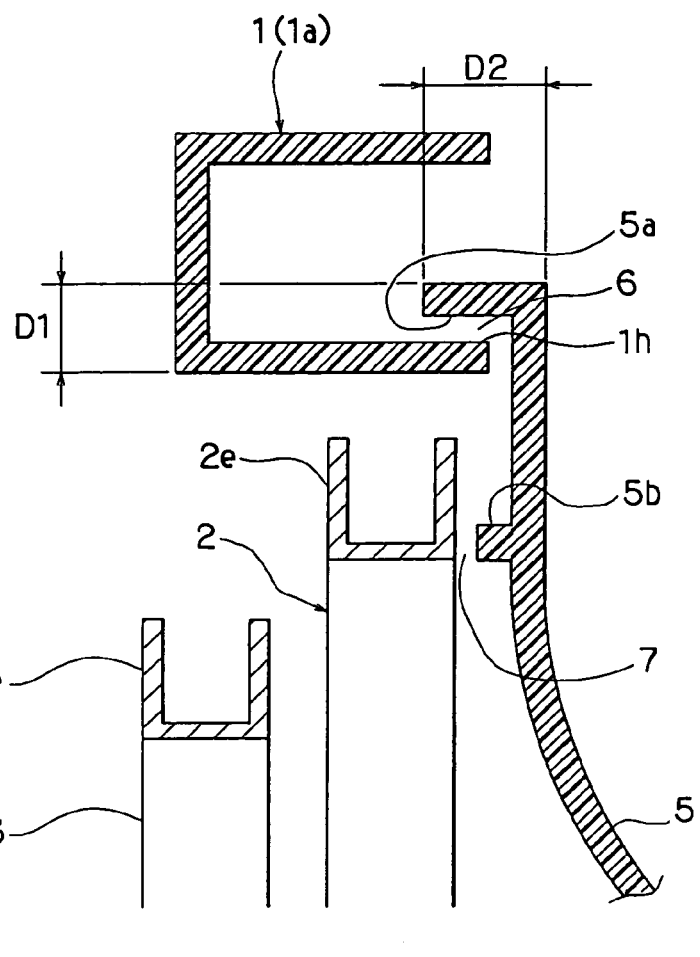
FIG. 2 is a cross-sectional view of the front end structure shown in FIG. 1 taken along a line II—II.

The radiator 2 is a multi-flow type heat exchanger and constructed of a core portion 2c, header tanks 2d, and side plates 2e. The core portion 2c performs heat exchange between cooling water and air. The core portion 2c is constructed of a plurality of tubes 2a through which the cooling water flows and fins 2b disposed outside of the tubes 2a. The header tanks 2d are connected to the longitudinal ends of the tubes 2a to make communication with the tubes 2a. The side plates 2e are arranged at the ends of the core portions 2c to reinforce the core portion 2c. The side plates 2e are provided as reinforcing members in a form of beam. As shown in FIG. 2, the side plates 2e have substantially U-shaped cross-sections and extend in the longitudinal direction of the tubes 2a.

Similarly, the condenser 3 is a multi-flow type heat exchanger and is constructed of a core portion 3c performing heat exchange between a refrigerant and air, header tanks 3d, and side plates 3e. The core portion 3c includes a plurality of tubes 3a through which the refrigerant flows and fins 3b disposed outside of the tubes 3a. The header tanks 3d are connected to the longitudinal ends of the tubes 3a to make communication with the tubes 3a. The side plates 3e are arranged at the ends of the core portion 3c to reinforce the core portion 3c. The side plates 3e are provided as reinforcing members in a form of beam. As shown in FIG. 2, the side plates 3e have substantially U-shaped cross-sections and extend in the longitudinal direction of the tubes 3a.

On the rear side of the frame portion 1a and the radiator 2, electric blowers (fans) 4 for creating a flow of air passing through the radiator 2 and the condenser 3 are provided. The fans 4 are mounted to the front end panel 1 through a fan shroud 5.

Here, the fan shroud 5 surrounds a space between the fans 4 and the heat exchangers such as the radiator 2 and the condenser 3. The fan shroud 5 is provided to restrict the air created by the fans 4 from bypassing through the heat exchangers 2, 3, that is, to introduce the air to pass through the heat exchangers 2, 3. In the embodiment, the fan shroud 5 also functions as a fixing member for fixing the fans 4 to the radiator 2, the front end panel 1, and the like.

Similar to the front end panel 1, the fan shroud 5 is a resin article, a mechanical strength of which is reinforced with glass fiber and carbon fiber. The fan shroud 5 and the front end panel 1 are molded as separate articles. The fan shroud 5 is for example fixed to the front end panel 1 through fastening means such as bolts.

Figure 3:
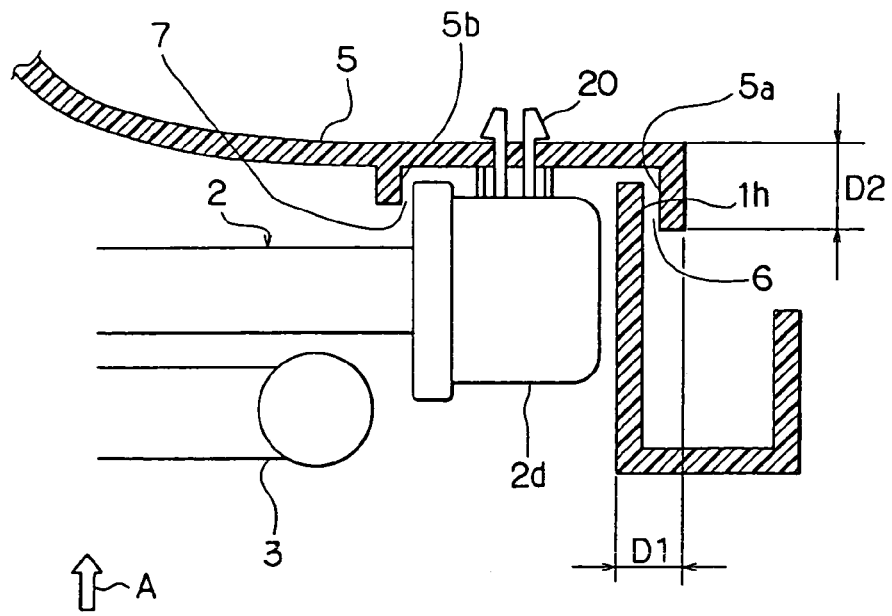
FIG. 3 is a cross-sectional view of the front end structure shown in FIG. 1 taken along a line III—III.

As shown in FIGS. 2 and 3, the front end panel 1 forms an opposing panel portion 1h opposing the outer peripheral part of the fan shroud 5. The fan shroud 5 forms an opposing shroud portion 5a opposing the opposing panel portion 1h. The opposing panel portion 1h and the shroud opposing portion 5a define a labyrinthine gap 6 between them.

Specifically, when viewed along the flow direction (arrow A) of the air, the opposing panel portion 1h and the opposing shroud portion 5a overlap with each other at a predetermined dimension D1, as shown in FIG. 2. Also when viewed from the top, the opposing panel portion 1h and the opposing shroud portion 5a overlap with each other within a range of a predetermined dimension D2. By this, the shape of the gap 6 defining air passage is meandered or cranked. Because pressure loss of air flowing through the gap 6 is increased, it is less likely that the air bypassing the radiator 2 will be sucked by the fans 4 through the gaps 6. Accordingly, this labyrinthine gap 6 provides a mechanical sealing structure.

In the embodiment, the opposing panel portion 1h and the opposing shroud portion 5a are formed substantially entirely along the peripheries of the front end panel 1 and the fan shroud 5 so that the outer periphery of the radiator 2 is entirely surrounded.

Further, the fan shroud 5 forms a sealing projection (shroud projection) 5b for defining a labyrinthine gap 7 between the fan shroud 5 and the radiator 2. When viewed along the air flow direction A, the sealing projection 5b is formed at a position corresponding to the end of the core portion 2c so that the air is restricted from leaking through a gap between the fan shroud 5 and the radiator 2.

As shown in FIG. 1, a bumper reinforcing member 9 is arranged in front of the front end panel 1. The bumper reinforcing member 9 is provided to absorb a colliding impact from the front side of the vehicle. Further, the bumper reinforcing member 9 is surrounded by a resinous bumper cover 10. A hood lock 11 is for example provided at the top of the frame portion 1a as a fixing member for fixing a cover, such as an engine hood or a bonnet, provided at the front end of the vehicle.

Since the front end panel 1 and the fan shroud 5 are provided as separate parts, the front end panel 1 and the fan shroud 5 can be independently exchanged or repaired, such as when the vehicle collides and when the parts are broken. Accordingly, serviceability is improved.

Since the gap 6 between the front end panel 1 and the fan shroud 5 is a labyrinthine configuration, it is less likely that the air will leak through the gap between the front end panel 1 and the fan shroud 5. Therefore, the decrease in the heat exchanging performances of the heat exchangers 2, 3 is restricted. Also, it is less likely that the air bypassing the heat exchangers 2, 3 will be introduced toward the fan shroud 5 through the gap 6.

Further, the sealing projection 5b is formed at a position corresponding to the outer periphery of the core portion 2c of the radiator 2. Since the gap 7 between the radiator 2 and the fan shroud 5 is provided in a labyrinthine configuration by the sealing projection 5b, it is less likely that the air will leak or enter through the gap 7. Therefore, the performances of the heat exchanger 2, 3 are sufficiently maintained.

Second Embodiment

Figure 4:
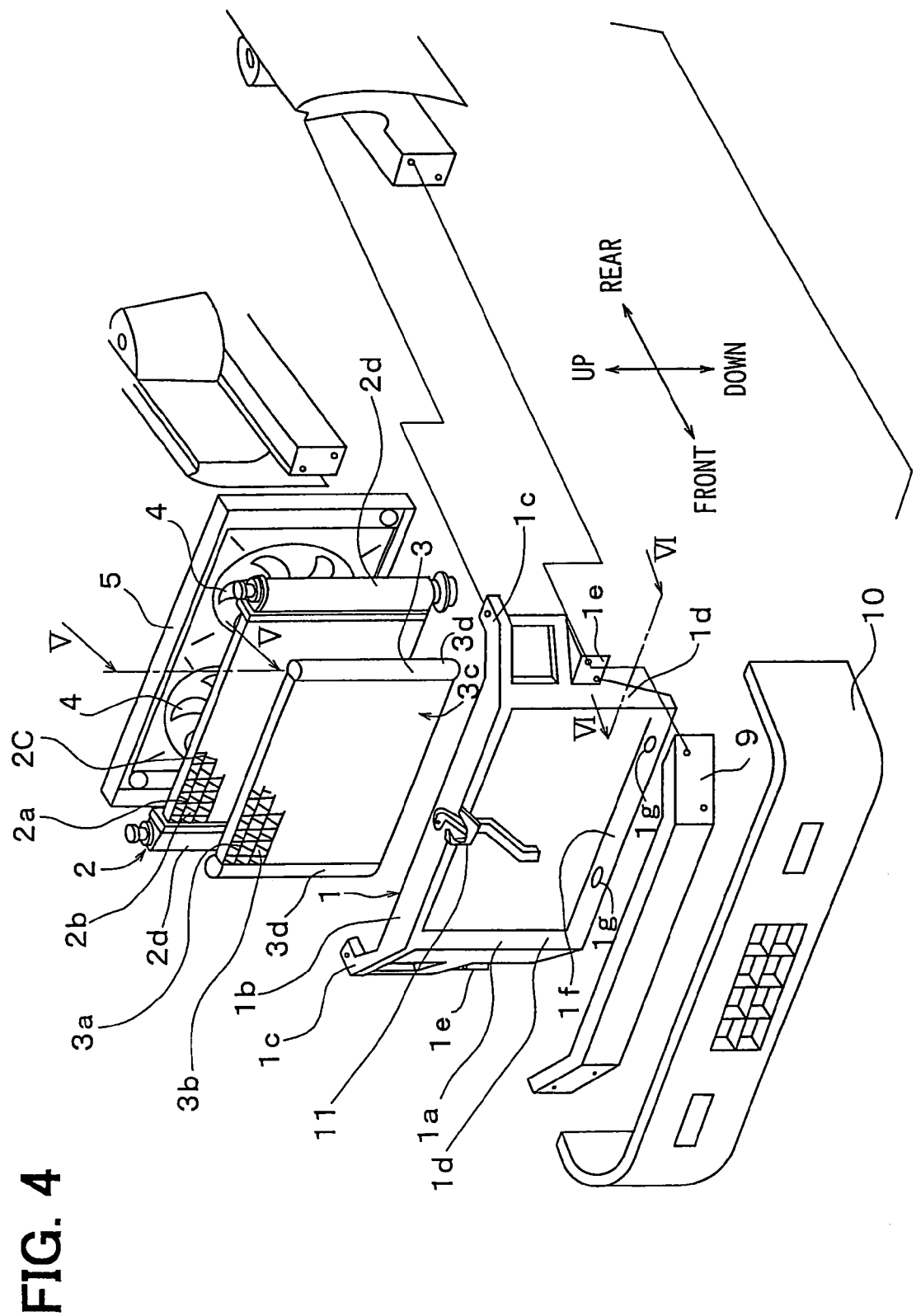
FIG. 4 is an exploded perspective view of a front end structure of a vehicle according to a second embodiment of the present invention.
Figure 5:
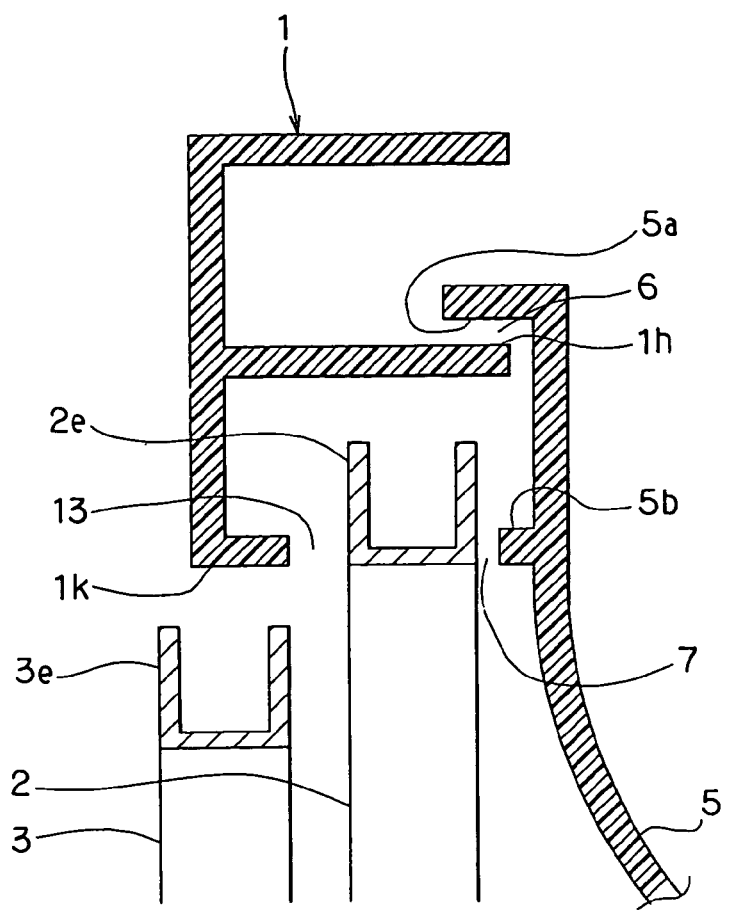
FIG. 5 is a cross-sectional view of the front end structure shown in FIG. 4 taken along a line V—V.
Figure 6:
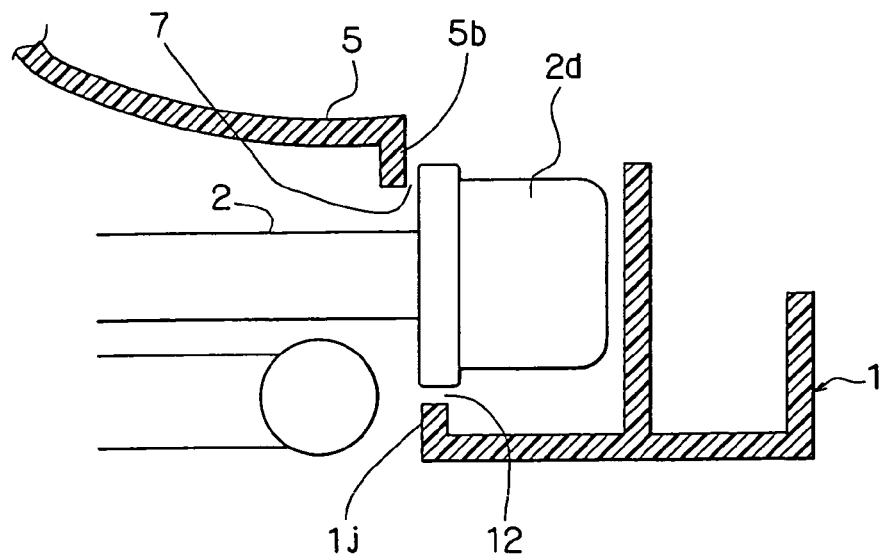
FIG. 6 is a cross-sectional view of the front end structure shown in FIG. 4 taken along a line VI—VI.

Referring to FIGS. 4 to 6, the opposing shroud portion 5a is formed at the positions other than the position corresponding to the header tanks 2d of the radiator 2. That is, the opposing shroud portion 5a is formed at positions corresponding to the side plates 2e of the radiator 2.

The labyrinthine gap structure 6, which is constructed by the opposing panel portion 1h and the opposing shroud portion 5a, is not formed at the positions corresponding to the header tanks 2d of the radiator 2. Instead, the front end panel 1 forms a sealing projection (second panel projection) 1j to define a labyrinthine gap 12 between the header tank 2d and the front end panel 1, as shown in FIG. 6.

Further, as shown in FIG. 5, the front end panel 1 forms a sealing projection (first panel projection) 1k at a position corresponding to the side plate 2e on a front side of the radiator 2, that is, on a side opposite to the fan shroud 5 with respect to the radiator 2. The sealing projection 1k defines a labyrinthine gap 13 between the front end panel 1 and the radiator 2. Also in the second embodiment, the fan shroud 5 forms the sealing projection 5b at the position corresponding to the periphery of the core portion 2c of the radiator 2.

Since the opposing shroud portion 5a is not formed at positions corresponding to the header tanks 2d, the fan shroud 5 is easily separated from the front end panel 1 without removing a radiator pipe, which is connected to the header tank 2d. Therefore, the fan shroud 5 is more easily separated from the front end panel 1 than the case in which the radiator 2 including the header tanks 2d are entirely surrounded by the opposing shroud portion 5a as in the first embodiment.

Accordingly, when the parts are broken such as by a vehicle collision, the front end panel 1 or the fan shroud 5 is easily solely exchanged or repaired. Therefore, serviceability is improved.

Also, the labyrinthine gap structures 13, 7, constructed of the sealing projections 1k, 5b are formed on the front side and the rear side of the side plates 2e of the radiator 2, respectively. Since the gaps on the front side and the rear side of the radiator 2 are sealed by the labyrinthine gap structures 13, 7, the airflow bypassing the radiator 2 is restricted from flowing toward the radiator 2 through the gaps. Also, leakage of the air having passed through the heat exchanger 2, 3 is restricted by the labyrinthine gap structures 13, 7. Accordingly, the heat exchange performance of the heat exchangers 2, 3 are sufficiently maintained.

In the first embodiment and the second embodiment, the labyrinthine gap structures 6, 7, 13, which provide the mechanical sealing structures, actually define gaps. However, the labyrinthine gap structures 6, 7, 13 can provide the mechanical sealing function even if the gap is actually zero. Thus, the labyrinthine gap structure of the embodiments includes the case in which the actual gap dimension is zero.

In the first and second embodiments, the fan shroud 5 is fixed to the front end panel 1. However, the present invention is not limited to the above. As shown in FIG. 3, for example, a nail portion 20 is formed on the header tank 2d of the radiator 2. The fan shroud 5 can be fixed to the radiator 2 through the nail portion 20.

In the first and second embodiments, the front end panel 1 and the fan shroud 5 are made of resin materials. However, the present invention is not limited to the above. For example, the front end panel 1 and the fan shroud 5 can be made of metal such as aluminum alloy or magnesium alloy.

The present invention is not limited to the above embodiments, but may be implemented in other ways without departing from the spirit of the invention.

What is claimed is:

1. A front end structure of a vehicle, comprising:
   a front end panel provided at a front part of the vehicle;
   a heat exchanger fixed to the front end panel;
   a fan disposed adjacent to the heat exchanger for creating a flow of air passing through the heat exchanger; and
   a fan shroud provided on a periphery of the fan to restrict the flow of air created by the fan from bypassing the heat exchanger, wherein
   the front end panel forms an opposing panel portion opposing an outer periphery of the fan shroud, the fan shroud forms an opposing shroud portion opposing the opposing panel portion of the front end panel, and the opposing panel portion and the opposing shroud portion define a labyrinthine gap structure therebetween;
   the fan shroud is disposed at a downstream position of the heat exchanger with respect to a flow direction of the air,
   the fan shroud forms a shroud projection projecting toward the front end panel;
   the shroud projection defines another labyrinthine gap structure between the fan shroud and the heat exchanger;
   the heat exchanger includes a core portion that has tubes through which fluid flows and fins provided on outer surfaces of the tubes and a header tank connected to ends of the tubes to extend in a direction perpendicular to longitudinal directions of the tubes;
   the shroud protection of the fan shroud is provided at a position corresponding to the end of the core portion when viewed in the flow direction of the air;
   the front end panel forms a first panel protection that defines a further another labyrinthine gap structure between the header tank and the front end panel; and
   the front end panel forms second panel projection on a side opposite to the fan shroud with respect to the heat exchanger.

2. The front end structure according to claim 1, wherein the second panel projection is disposed at a position corresponding to the end of the core portion of the heat exchanger and opposite to the shroud projection.

3. The front end structure according to claim 1, wherein the opposing panel portion and the opposing shroud portion are disposed to surround an outer periphery of the heat exchanger at a position other than a position corresponding to the header tank of the heat exchanger.

4. The front end structure according to claim 1, wherein the opposing panel portion and the opposing shroud portion are disposed to entirely surround an outer periphery of the heat exchanger.

5. The front end structure according to claim 1, wherein the opposing panel portion and the opposing shroud portion include sections overlapping each other.

6. A front end structure of a vehicle, comprising:
   a front end panel provided at a front part of the vehicle;
   a heat exchanger fixed to the front end panel, the heat exchanger having a core portion and header tanks connected to the core portion;
   a fan disposed downstream of the heat exchanger with respect to a flow direction of air passing through the heat exchanger; and
   a fan shroud provided on a periphery of the fan, wherein
   the front end panel forms an opposing panel portion extending toward the fan shroud and generally parallel to the flow direction of air,
   the fan shroud forms an opposing shroud portion extending toward the front end panel and parallel to the opposing panel portion of the front end panel,
   the opposing panel portion and the opposing shroud portion overlap each other for defining a first labyrinthine gap structure therebetween, and
   the front end panel further forms a panel projection extending toward the fan shroud and parallel to the opposing panel portion at a position corresponding to an end of the core portion of the heat exchanger, for defining a second labyrinthine gap structure between the front end panel and the heat exchanger.

7. The front end structure according to claim 6, wherein the panel projection of the front end panel is disposed at a location upstream of the heat exchanger with respect to the flow direction of air.

* * * * *